United States Patent [19]

Hedrich

[11] 4,167,125
[45] Sep. 11, 1979

[54] REAR-WHEEL MOUNTING FOR BICYCLE

[76] Inventor: Eberhard Hedrich, Osdorfer Landstr. 161, Hamburg, Fed. Rep. of Germany D-2000

[21] Appl. No.: 789,227

[22] Filed: Apr. 20, 1977

[51] Int. Cl.² .............................................. F16H 7/18
[52] U.S. Cl. .................................... 74/242.5; 74/242; 74/217 B
[58] Field of Search ............... 74/242.5, 242, 473 P, 74/476, 483 K, 217 B

[56] References Cited

U.S. PATENT DOCUMENTS

| | | | |
|---|---|---|---|
| 770,521 | 9/1904 | Fitzgerald | 74/476 |
| 818,654 | 4/1906 | Bailey | 74/242.5 |
| 842,808 | 1/1907 | McVey | 74/242.5 |
| 885,814 | 4/1908 | Warner et al. | 74/476 |
| 1,165,738 | 12/1915 | Willet | 74/242 |
| 1,237,116 | 8/1917 | Still | 74/476 |
| 1,284,941 | 11/1918 | Stagl | 74/242.5 |
| 1,362,967 | 12/1920 | Stagl | 74/242.5 |
| 1,399,388 | 12/1921 | Jones | 74/242.5 |
| 1,531,233 | 3/1925 | Davis | 74/242.5 |
| 2,141,513 | 12/1938 | Carr | 74/242.5 |
| 2,477,589 | 8/1949 | DuShane | 74/483 K |
| 2,855,795 | 10/1958 | Beal | 74/483 K |
| 3,364,762 | 1/1968 | Maeda | 74/217 B |

FOREIGN PATENT DOCUMENTS

| | | | |
|---|---|---|---|
| 2557975 | 4/1977 | Fed. Rep. of Germany | 74/217 B |
| 2648928 | 5/1977 | Fed. Rep. of Germany | 74/242.5 |
| 4272 | of 1893 | United Kingdom | 74/242.5 |

Primary Examiner—Samuel Scott
Assistant Examiner—William R. Henderson
Attorney, Agent, or Firm—Karl F. Ross

[57] ABSTRACT

A demountable rear-wheel axle of a bicycle, carrying a set of sprockets of progressively decreasing diameters, is detachably held in a forked frame member next to a generally crescent-shaped stationary supporting element secured to that frame member, the supporting element having an arcuate edge generally paralleling about half the periphery of the adjoining smallest diameter sprocket. A guide bracket movable generally parallel to the wheel axle, engaging the driving chain of the bicycle, can be aligned not only with the several sprockets but also with the stationary supporting element to let the chain embrace that element when it is desired to remove the rear wheel; the movement of the guide bracket is controlled by a hand lever which normally is blocked by a releasable latch from aligning that bracket with the supporting element.

6 Claims, 10 Drawing Figures

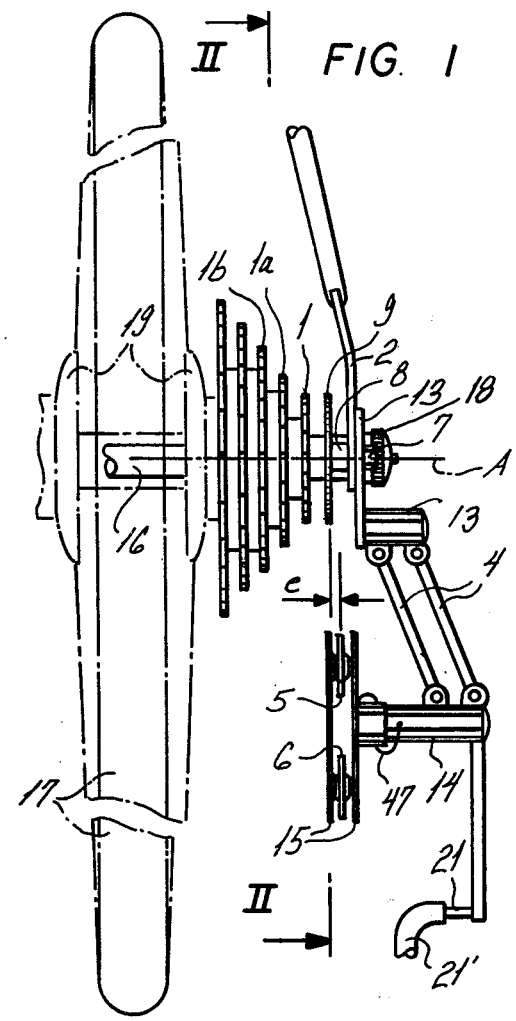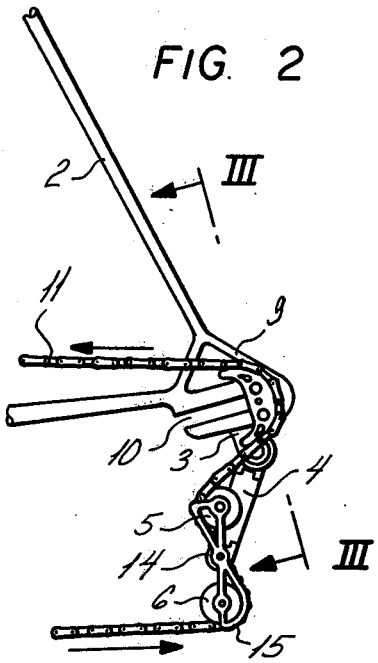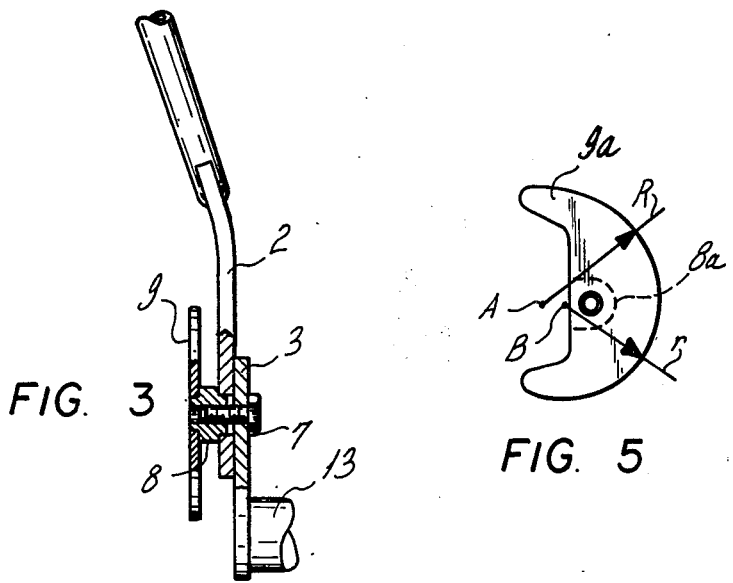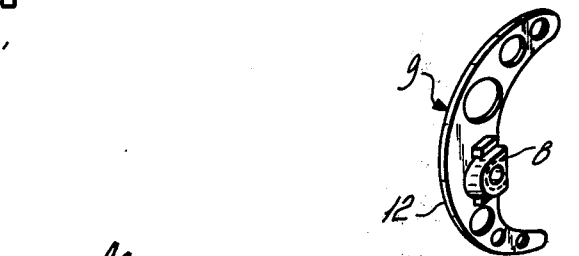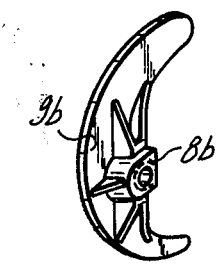

REAR-WHEEL MOUNTING FOR BICYCLE

FIELD OF THE INVENTION

My present invention relates to a mounting for the rear wheel of a bicycle, particularly (though not exclusively) a bicycle with variable speed ratio whose traction wheel is selectively rotatable by a pedal-driven chain through the intermediary of multispeed transmission means including several sprocket wheels of different diameters mounted on the rear axle.

BACKGROUND OF THE INVENTION

Conventional bicycles with a multispeed transmission of the derailleur type are provided with a gear-shifting mechanism which includes a guide engaging the driving chain and, through selective alignment of that chain guide with a particular sprocket wheel of that transmission, allows a certain speed ratio to be chosen. To change from one speed ratio to another while in motion, the rider operates a handle on the vehicle frame which displaces the chain guide, usually through the intermediary of a Bowden cable, in a direction substantially parallel to the wheel axis. The chain guide carries a spring-loaded tension roller (with or without sprocket teeth) taking up the slack of the chain which varies for the different sprocket wheels. When it becomes necessary to detach the rear axle and its traction wheel from the frame, e.g. for replacement of a tire, the shifting mechanism and the chain remain attached to the frame; the chain, however, must be disengaged from the sprocket assembly and must thereafter be re-engaged therewith, which is a rather laborious procedure.

OBJECTS OF THE INVENTION

The general object of my present invention, therefore, is to provide means in a bicycle, especially one of the multi-speed type, simplifying the demounting and remounting of the rear axle together with its traction wheel and its sprocket wheels.

A more particular object is to provide safeguards in such a bicycle for preventing the untimely disengagement of the chain from the transmission means normally driven by it.

SUMMARY OF THE INVENTION

In accordance with my present invention, the frame of the bicycle carries a stationary supporting element disposed near the rear axle adjacent the smallest-diameter sprocket wheel thereof and provided with a curvilinear edge which generally parallels the chain-contacting (i.e. rearward) portion of the periphery of an adjoining toothed sector of the nearest sprocket wheel, the chain being transferable to that supporting element and back to the adjacent sprocket wheel by guide means alignable therewith for this purpose. Advantageously, the curvilinear edge (or at least a segment thereof) is circularly arcuate and centered on the sprocket axis. In a multispeed bicycle with a transmission of the derailleur type referred to, the gear-shifting mechanism serving for a change of the speed ratio can be used as the guide means according to my present improvement by the simple expedient of increasing its range of axial displacement.

In the latter instance it will be desirable to prevent the untimely displacement of the shifting mechanism into its disassembly position, that is to say the alignment of the chain guide with the stationary supporting element, without restricting the normal operating range of that mechanism. For that purpose, pursuant to another feature of my invention, I prefer to provide releasable stop means coacting with the operating lever for blocking a shifting of the chain guide into the disassembly position.

BRIEF DESCRIPTION OF THE DRAWING

The above and other features of my invention will now be described in detail with reference to the accompanying drawing in which:

FIG. 1 is a fragmentary end view of the rear part of an otherwise conventional multispeed bicycle equipped with a stationary chain-supporting element and associated shift means embodying the present improvement;

FIG. 2 is a side view of the assembly of FIG. 1, taken on the line II—II thereof;

FIG. 3 is a cross-sectional view taken on the line III—III of FIG. 2;

FIG. 4 is a perspective view of the chain-supporting element seen in FIGS. 1-3, drawn to a larger scale;

FIG. 5 is a face view of a modified chain-supporting element;

FIG. 6 is a view similar to FIG. 4, illustrating another modified supporting element;

SPECIFIC DESCRIPTION

Figure 7:
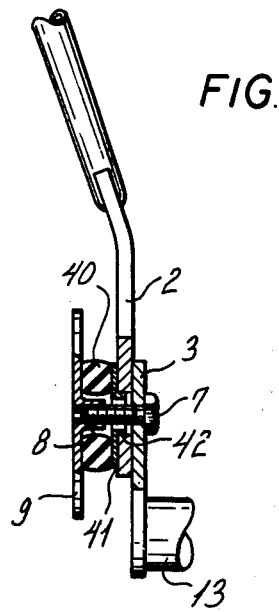
FIG. 7 is a view similar to FIG. 3, showing a further modification.

In FIGS. 1-3 I have shown one of the legs 2 of the rear fork of a bicycle frame with its rear axle 16 (omitted in FIGS. 2 and 3) which is detachably held in a slot 10 of that leg with the aid of conventional fastening means including a nut 18. Axle 16 carries a set of sprocket wheels 1, 1a, 1b etc. selectively engageable by a chain 11 which also engages a driving sprocket, not shown, connected in the usual manner with the pedals of the bicycle. A rear or traction wheel, whose hub 19 is coupled with the set of sprockets 1 etc. via the customary freewheel, has been illustrated in phantom lines at 17.

An extension 3 of frame leg 2 has a hole traversed by a bolt 7 which is threaded into a hub 8 rigid with a generally crescent-shaped stationary chain-supporting element 9 also shown in FIG. 5. Supporting element 9 is closely juxtaposed with the smallest-diameter sprocket 1, its distance from that sprocket substantially equaling the spacing of the several sprockets 1, 1a, 1b etc. of progressively larger diameters. Frame extension 3 carries a stud 13 to which a pair of arms 4, forming part of a parallelogrammatic linkage, are articulated to serve as a support for a rod 14 parallel to axle 16. Rod 14 carries a shiftable chain guide 15 in the form of a bracket swingably mounted thereon, this bracket having two halves flanking the chain 11 and holding two rollers 5 and 6 engaged by that chain. A spring 47, anchored to rod 14 and bracket 15, biases that bracket in a counterclockwise direction (as viewed in FIG. 2) to hold the chain 11 under the necessary tension. Linkage 4 enables the guide bracket 15 to be displaced parallel to itself, together with the engaged chain, into selective alignment with any one of sprockets 1, 1a, 1b etc. or with the stationary supporting element 9. This displacement is controlled by a hand lever 20, shown in FIGS. 8 and 9, as more fully described hereinafter.

In the off-normal position of bracket 15 shown in FIG. 1, designed to facilitate the extraction of axle 16 with its sprockets and traction wheel 17 from the frame, the rollers 5 and 6 may be offset by a small distance e from supporting element 9 to avoid any interference of guide 15 with the removal and reinsertion of the rear-wheel assembly.

The generally crescent-shaped supporting element 9 of FIGS. 1–4, which is apertured to reduce its weight, has a smooth curvilinear edge 12 which is more or less centered on the wheel axis A (FIG. 1) and may have a radius of curvature approximately equal to that of sprocket wheel 1; edge 12 extends over substantially 180° and lies parallel to the toothed rear sector of sprocket 1 engageable by chain 11. A modified supporting element 9a (FIG. 5) of nonconstant curvature, provided with a hub 8a, has upper and lower quadrants of different radii R and r merging tangentially into each other, the upper quadrant being again substantially centered on axis A whereas the lower quadrant is centered on a different axis B. In this instance, the smaller radius r of the lower quadrant may substantially correspond to that of neighboring sprocket 1 whereas radius R is somewhat larger to facilitate the retransfer of the chain to that sprocket.

In FIG. 6 I have shown a supporting element 9b, generally similar to element 9 of FIG. 4, integrally cast or molded with its hub 8b from metal or synthetic resin.

In FIG. 7 I have shown the supporting element 9 separated from frame member 2 by a washer 41 and a resilient ring 40, e.g. of foam polyurethane, adhesively bonded to washer 41 and to element 9. The hub 8 of element 9, surrounded by ring 40, is threadedly engaged by the bolt 7 which not only holds that element in position but also adjusts its separation from the nearest sprocket 1 (FIG. 1). Washer 41 has a rectangular collar 42 fitting into a corresponding aperture of frame leg 2 to prevent its rotation with reference thereto.

Figure 8:
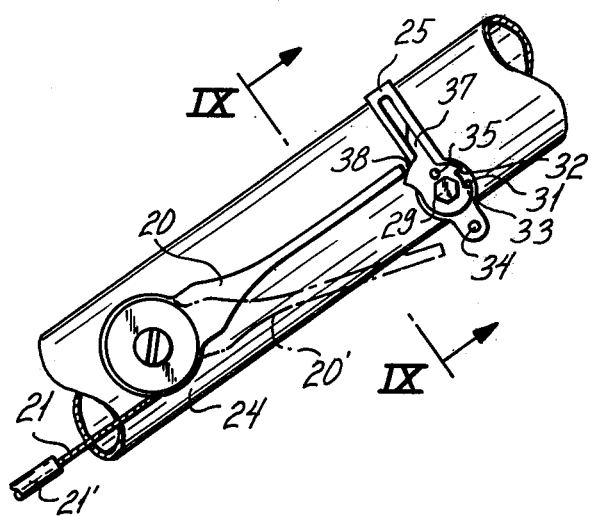
FIG. 8 is a side view of an intermediate part of the bicycle frame, drawn to a larger scale, with a control device for the shifting mechanism of FIGS. 1 and 2 mounted thereon.
Figure 9:
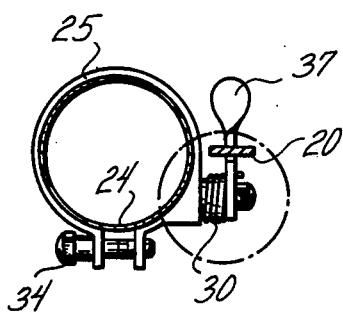
FIG. 9 is a cross-sectional view taken on the line IX—IX of FIG. 8.
Figure 10:
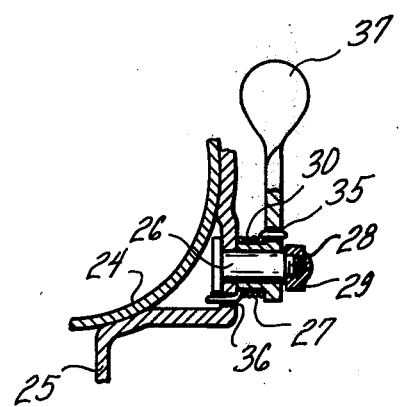
FIG. 10 is an enlarged view, partly in section, of a detail included in an area X of FIG. 9.

In FIGS. 8–10 I have shown a central member 24 of the bicycle frame, rising toward the nonillustrated handlebar mounting, which carries the operating lever 20 for the shifting of bracket 15 through the intermediary of a Bowden cable 21 whose sheath 21' is secured to the frame in a manner not further illustrated. In the illustrated position of lever 20, which corresponds to alignment of guide bracket 15 with the first sprocket 1, that lever abuts a shoulder 38 of a latch 37 which has a hub 27 traversed by a bolt 26; this bolt is welded to a cuff 25 clamped onto bar 24 by a bolt 34. Latch 37 has two teeth 32 and 33 enabling its limited rotation about bolt 26 between an illustrated blocking position, in which a pin 31 on cuff 25 engages the tooth 33, and an alternate unblocking position in which that pin is in contact with tooth 32. Only in the latter position will it be possible to swing the lever 20 into a position 20', indicated in phantom lines, in which the bracket 15' is aligned with supporting element 9 as shown in FIG. 1. Latch 37 is held in place by a cap nut 29 engaging a threaded extremity 28 of bolt 26. A spring 30 wound about the hub 27 is anchored in a bore 36 of cuff 25 and in a bore 35 of latch 37 to urge the latter into its illustrated blocking position.

This arrangement prevents an accidental disalignment of the chain-shifting bracket 15 from the transmission 1, 1a etc. while the bicycle is in motion. Such disalignment, preparatorily to a demounting of the traction wheel 17 and its axle 16, can be carried out only after the user has rotated the latch 37 in a clockwise direction as viewed in FIG. 8, against the force of spring 30, to release the lever 20. Upon subsequent reassembly, latch 37 automatically returns to its blocking position after the lever 20 has been swung back into its normal operating range to align the chain guide 15 with a selected sprocket.

I claim:

1. In a bicycle provided with a frame, a rear axle detachably secured to said frame, a traction wheel on said rear axle, a pedal-driven chain, transmission means on said rear axle including a plurality of coaxial sprocket wheels of progressively smaller diameters coacting with said chain for rotating said traction wheel, guide means on said frame engaged by said chain and provided with chain-tensioning means, and control means on said frame for shifting said guide means in a direction substantially parallel to said rear axle to align said chain with a selected sprocket wheel for changing the transmission ratio between the pedal and said traction wheel.

the improvement wherein said frame is provided with a stationary supporting element for said chain disposed adjacent the sprocket wheel of smallest diameter and provided with a curvilinear edge generally paralleling a chain-contacting portion of the periphery of the adjacent sprocket wheel, said guide means being selectively alignable with said supporting element to transfer said chain from said adjacent sprocket wheel to said supporting element preparatorily to a detachment of said rear axle from said frame, said control means including a manually displaceable lever provided with releasable stop means for normally preventing the alignment of said guide means with said supporting element.

2. The improvement defined in claim 1 wherein at least a segment of said curvilinear edge is an arc of a circle centered on the axis of said sprocket wheels.

3. The improvement defined in claim 2 wherein said arc has a radius substantially equaling that of said adjacent sprocket wheel.

4. The improvement defined in claim 1 wherein said supporting element is secured to said frame through an elastic spacer facilitating adjustment of the distance between said supporting element and said transmission means.

5. The improvement defined in claim 2 wherein said supporting element is secured to said frame through an elastic spacer facilitating adjustment of the distance between said supporting element and said transmission means.

6. The improvement defined in claim 3 wherein said supporting element is secured to said frame through an elastic spacer facilitating adjustment of the distance between said supporting element and said transmission means.

* * * * *